Sept. 28, 1965    M. D. MARTIN    3,208,792
VISOR ATTACHMENT
Filed Jan. 20, 1964

INVENTOR.
MARCUS DEWEY MARTIN
BY
ATTORNEY

United States Patent Office 3,208,792
Patented Sept. 28, 1965

3,208,792
VISOR ATTACHMENT
Marcus Dewey Martin, 1602 Ave. K, Lubbock, Tex.
Filed Jan. 20, 1964, Ser. No. 338,731
6 Claims. (Cl. 296—97)

This invention relates to an attachment for automobile visors permitting the area of protection against glare to be increased when desired in a rapid and inexpensive manner.

Visor attachments proposed in the past have almost invariably involved relatively complex arrangements and have lacked the advantage of being universally applicable to existing visors without modification or involved installation.

It is among the objects of the present invention to provide an attachment for an automobile visor comprising a body of light obscuring material having upper and lower edges and front and rear surfaces, the front surface being adapted for adjustable engagement with the aft surface of a visor and the rear surface providing a groove with substantially parallel side walls, and a reversely bent leaf spring having one leg for engaging the fore surface of a visor and a depending leg received in the groove for engagement with the side walls of the groove to guide the body and for biasing the body towards the visor to which it is attached. An operating element is preferably carried on the rear surface of the body, and preferably bridges the groove. The body may be molded so as to form the groove and operating element integral therewith. The front surface of the body is preferably substantially plane so as to be readily slidable on the aft surface of the visor to which it is attached. The groove is preferably formed by a pair of rails projecting from the rear surface of the body, and the groove preferably extends from the upper edge of the body to its lower edge.

A more complete understanding of the invention will follow from a description of the accompanying drawing wherein.

Figure 6:
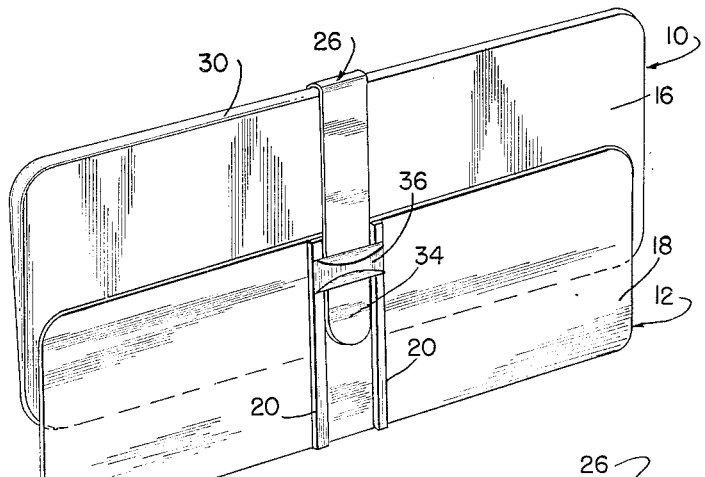
FIG. 6 is a perspective view of the assembly depicting the attachment in its lowered position corresponding to that depicted in FIG. 2.

The visor 10 is a conventional automobile accessory well known in the art. The attachment 12 is a body of material, such as a plastic composition, which may be opaque or translucent, as desired. The front surface 14 of the attachment is preferably substantially plane so that it will slide readily to various adjusted positions along the aft surface 16 of the visor 10. On the rear surface 18 of the visor, a pair of rails 20 are arranged to define a groove 22 having substantially parallel side walls 24. A reversely bent leaf spring 26 is provided with one leg 28 which hooks over the upper edge 30 of the visor and engages the fore surface 32 of the visor. The other leg 34 of the spring is received in the groove 22 for engagement with the substantially parallel side walls 24 so as to guide the attachment 12 as it is shifted upwardly and downwardly between its extreme positions. Moreover, because of its inherent resilience, the spring 26 biases the attachment against the visor at all times, requiring no additional attaching means.

To facilitate movement of the attachment relative to the visor, an operating element or handle 36 is provided on the rear surface of the attachment, bridging the rails 20 and contoured to adapt it to be grasped between the thumb and forefinger of the user.

The attachment together with its rails 20 and operating element 36 can be formed integrally by molding suitable plastic materials. Alternatively, the body can be fabricated in other ways.

The leaf spring can be made of suitable plastics or metals and if desired, may be covered with any decorative material that might be appropriate.

Figure 1:
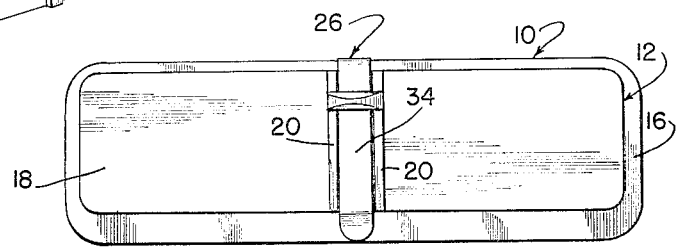
FIG. 1 is an elevation depicting the attachment contemplated by the present invention attached to a conventional automobile visor, the visor being in its operating position but the attachment being retracted.
Figure 2:
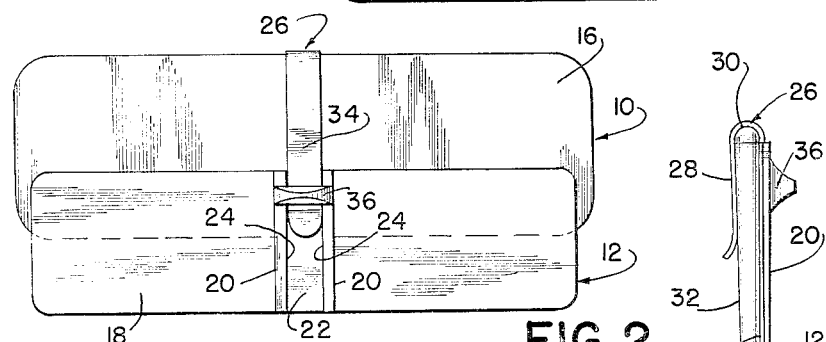
FIG. 2 is an elevation similar to FIG. 1 depicting the attachment lowered relative to the visor so as to increase the area of glare protection.
Figure 5:
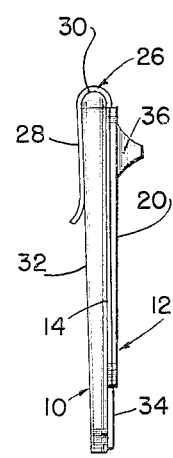
FIG. 5 is an end elevation of the assembly of FIG. 1.
Figure 3:
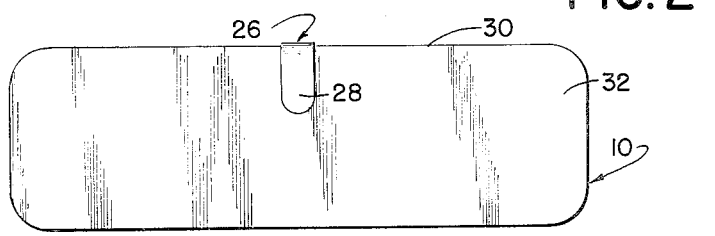
FIG. 3 is an elevation showing the fore surface of the visor as it would appear with the attachment in the position depicted in FIG. 1.
Figure 4:
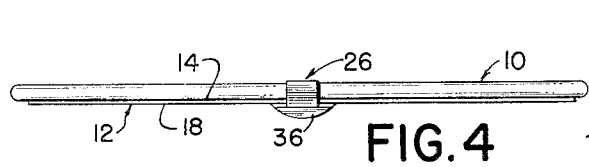
FIG. 4 is a plan view of the assembly of FIG. 1.

It will be clear from the foregoing description that when it is desired to increase the effective area of the conventional visor 10, the attachment 12 can be lowered from its ineffective position depicted in FIG. 1 to any desired effective position, such as that typified by FIG. 2.

Whereas only one form of the invention has been described with reference to the accompanying drawing, it will be clear that such modifications as will be suggested to those skilled in the art are contemplated within the scope of the appended claims.

I claim:
1. An attachment for an automobile visor comprising a body of light obscuring material having upper and lower edges and front and rear surfaces, said front surface being adapted for adjustable engagement with the aft surface of a visor and said rear surface providing a groove with substantially parallel side walls, a reversely bent leaf spring having one leg for engaging the fore surface of a visor and a depending leg received in said groove for engagement with the side walls of said groove to guide said body and for biasing said body towards the visor to which it is to be attached, and an operating element carried on the rear surface of said body, said operating element bridging said groove.

2. An attachment according to claim 1 wherein said operating element is integral with said body.

3. An attachment according to claim 1 wherein said body is molded to contain said groove in its rear surface.

4. An attachment according to claim 1 wherein the front surface of said body is substantially plane.

5. An attachment according to claim 1 wherein a pair of rails project from the rear surface of said body to define said groove.

6. An attachment according to claim 1 wherein said groove extends from said upper edge to said lower edge.

References Cited by the Examiner

UNITED STATES PATENTS

| 2,101,901 | 12/37 | Fletcher | 296—97 |
| 2,685,336 | 8/54 | Menighan | 296—97 X |
| 3,071,408 | 1/63 | Turner | 296—97 |

FOREIGN PATENTS

| 445,793 | 4/36 | Great Britain. |

BENJAMIN HERSH, *Primary Examiner.*